Oct. 24, 1939.    G. STEINGRUBER    2,177,230
ELECTRIC OVEN
Filed July 3, 1935
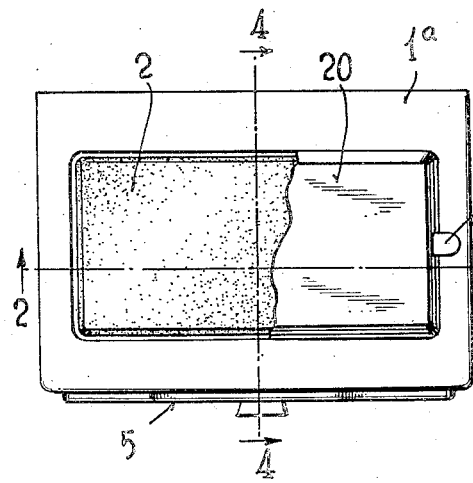
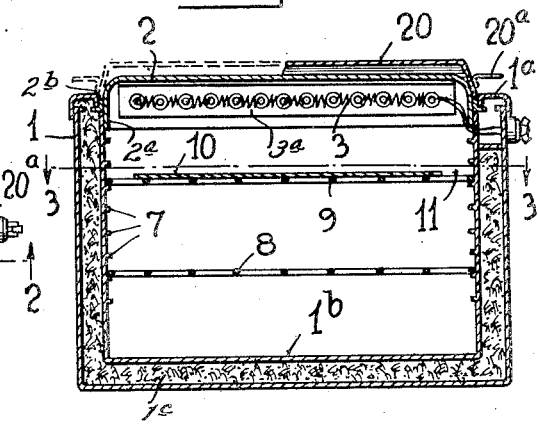
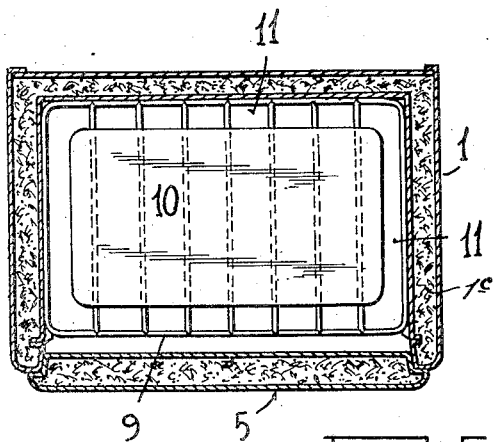
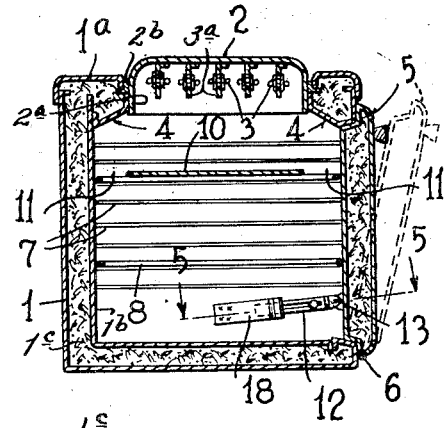
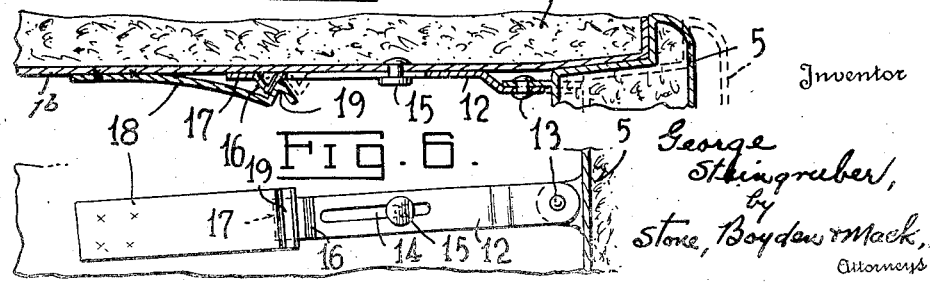

Patented Oct. 24, 1939

2,177,230

UNITED STATES PATENT OFFICE 2,177,230

ELECTRIC OVEN

George Steingruber, Huntsville, Ala.

Application July 3, 1935, Serial No. 29,695

2 Claims. (Cl. 219—35)

This invention relates to stoves or ovens, and more particularly to electric ovens for domestic use.

In such ovens as usually constructed, two or more heating units are employed and disposed at both the top and bottom of the oven, and when baking, it is necessary to use both units.

The general object of the present invention is to provide an improved arrangement whereby entirely satisfactory baking can be accomplished with the use of but a single heating unit, the same being located at the top of the oven so that it may be used for broiling also.

A further object is to provide an improved oven having a cooking top and equipped with but a single heating unit so constructed and arranged as to both heat the cooking top and also generate a baking temperature within the oven.

Still another object of the invention is to provide simple and efficient means for holding the oven door either partially or completely closed, as desired.

Other objects and advantages of the invention will hereinafter appear as the description proceeds.

In order that the invention may be readily understood, reference is had to the accompanying drawing, forming part of this specification, and in which:

Fig. 1 is a plan view of my improved oven, with parts being broken away;

Fig. 2 is a vertical section through the same substantially on the line 2—2 of Fig. 1;

Fig. 3 is a horizontal section substantially on the line 3—3 of Fig. 2;

Fig. 4 is a vertical transverse section substantially on the line 4—4 of Fig. 1;

Fig. 5 is a fragmentary sectional view on an enlarged scale, substantially on the line 5—5 of Fig. 4; and Fig. 6 is a fragmentary front elevation of the parts shown in Fig. 5.

Referring to the drawing in detail, the oven comprises a rectangular casing made up of spaced outer and inner sheet metal shells 1 and 1ᵇ, the space between them being filled with suitable insulating material 1ᶜ.

Into the central portion of the top of the oven is set a hot plate or cooking top 2, preferably formed of sheet steel and in the shape of an inverted open pan, having downwardly extending flanges 2ᵃ. As shown, the upper surface of the hot plate 2 is preferably slightly above the surface of the oven top.

My improved oven is intended for use chiefly in locations where there is no special wiring, and where it can be plugged into any ordinary 110 volt outlet. Under these conditions, the permissible maximum wattage is quite limited, and for this reason it is necessary to arrange the heating elements in a very compact and efficient manner. These heating elements are indicated at 3, and are shown as carried by sheet metal strips 3ᵃ of angle section, secured directly to the under side of the cooking top 2, and within the flanges 2ᵃ.

By reference to Fig. 4, it will be seen that the combined heating unit and cooking top above described is substantially narrower than the width of the oven. Thus the heating elements 3 are disposed relatively closely together, so that the entire heat generated by the available wattage is concentrated under a cooking top of relatively small area, and in this way it is possible to raise the temperature of such top to a degree high enough for effective cooking and boiling.

By further reference to Fig. 4, it will be observed that the side walls of the oven are formed at their upper edges with inwardly extending portions which engage the side flanges of the heating unit, and the lower surfaces of these projecting portions are preferably bevelled or inclined, as indicated at 4, in order to assist in reflecting the heat in the desired direction.

In order to support the cooking top or heating unit, I preferably secure to the sides 2ᵃ thereof, as by welding, small laterally projecting flanges 2ᵇ. (See Figs. 2 and 4.) They rest upon the upper edge of the inner shell 1ᵇ. To hold the cooking top firmly in position, and to form a tight seal between it and the oven walls, I place around the cooking top a frame 1ᵃ, as shown. This frame closes the space between the inner and outer shells, and provides a marginal portion constituting the top of the oven. It engages at its inner edges the flanges 2ᵇ, and thus securely anchors the cooking top or heating unit in position, the flanges 2ᵇ being confined between the edges of the inner shell 1ᵇ and the frame 1ᵃ.

The oven is provided at its front side with the usual insulated door 5, hinged at 6.

On the inside of the oven walls are provided the usual ribs or hanger supports 7 adapted to receive the customary removable rack or grid 8 on which rests the receptacle containing the material to be baked.

As will be understood from the foregoing description, I preferably do not employ any heating element or unit at the bottom of my improved oven, but rely entirely upon the single unit 3, at the top, for both heating the hot plate or cooking top 2 and for broiling and baking inside of the oven.

In order to secure the proper distribution of heat within the oven, so as to accomplish the satisfactory baking of material supported on the rack 8, I provide a second removable rack or grid 9 having secured thereto a protecting plate or shield 10. By reference to the drawing, it will be seen that this plate is in general of the same shape as the interior of the oven, but is smaller than the oven, whereby a space or passage 11 is provided between the margin of the plate or shield and the walls of the oven. Preferably the shield 10 is made of substantially the same width and area as the width and area of the heating unit or hot plate.

In this way, food supported on the rack 8 is protected from direct radiation of heat from the unit 3 and is thus prevented from burning on top, while at the same time, due to the spaces or passages 11, the heat is distributed through the oven in such manner that even the space below the rack 8 is raised to a baking temperature.

It will be understood, of course, that both the rack 8 and shield 10 may be supported at any desired height by resting them upon different pairs of ribs or hangers 7, as required. Thus, the shield may be placed at a greater or less distance from the heating unit and in this way the degree and distribution of heat in the lower part of the oven can be controlled.

I have found, in practice, that by suitably selecting the respective positions of the supporting rack 8 and the shield 10, it is possible to produce such a uniform distribution of heat in the lower part of the oven that articles, such as biscuits, placed in a pan or receptacle on the rack 8 will be satisfactorily browned both on top and at the bottom, and without burning.

It will be further understood that the single heating unit or element 3 serves both to generate a baking temperature in the oven, as above described, and also to heat the cooking top or hot plate 2 at the same time. Thus, food may be cooked on the hot plate while baking is being done in the oven.

In order to control the position of the door 5, I provide a brace member 12 pivoted to the door at 13 and having an elongated slot 14 therein, working over a fixed stud 15, set into the oven wall. This brace serves to limit the opening movement of the door in the usual manner.

In my improved construction, however, I combine with the brace a latch device for frictionally holding the door in closed or partially closed position. As illustrated in Figs. 5 and 6, I form at the inner end of the brace 12 a rib or corrugation 16, and extend the brace somewhat beyond this rib, as indicated at 17. A resilient catch member 18 is secured at one end to the oven wall and has its other end spaced slightly therefrom and provided with an inwardly projecting rib or corrugation 19.

When the door is moved toward closed position, the extended end 17 of the brace 12 is forced between the rib 19 and the side wall of the oven, and the resilience of the catch member 18 causes a frictional gripping of the end 17 of the brace sufficient to maintain the door in partially closed position, as shown in dotted lines in Figs. 4 and 5, and in full lines in Fig. 6. This partially closed position is desirable for certain types of cooking in which it is necessary to permit the escape of gases from the oven.

When, on the other hand, it is desired to tightly close the oven door, the rib 16 is forced under the rib 19 and snaps past it, due to the coaction between the beveled surface thereof, and the resilience of the member 18 then serves to maintain the door in closed position. Thus, it will be seen that I have provided a simple and efficient latch device by means of which the door may be frictionally held in either partially or completely closed position, as desired. At the same time, the two parts of the latch member readily disengage when a slight pull is exerted on the door handle.

When it is desired to generate a high degree of heat within the oven for baking purposes, I find that under some circumstances it is helpful to prevent the free radiation of heat from the top of the hot plate 2, in order that this heat may be conserved for use inside of the oven. To this end, I provide a removable metallic cover 20, as shown in Figs. 1 and 2, this cover completely enclosing the entire hot plate or cooking top 2, and being slightly spaced therefrom, as illustrated in Fig. 2. The cover is preferably provided with handles or lugs 20ª by which it may be lifted, when desired.

It will be understood that when the cover 20 is in position, and the heating unit is in operation, this cover serves to confine the heat within the oven to some extent, but at the same time, it also becomes heated and while not, of course, as hot as the cooking top 2 would be, it is nevertheless hot enough to be used for slow cooking. In other words, the cover 20 is not an insulating cover, but merely serves to modify or reduce the amount of heat passing upward from the heating unit, and at the same time to provide a cooking surface which is sufficiently hot for many purposes.

It will be further understood that when the cooking top 2 only is being used, for frying or the like, the efficiency of the unit 3 may be increased and radiation downward into the oven reduced, by placing the shield 10 on the upper pair of ribs 7, as close to the heating unit as possible.

What I claim is:

1. An electric oven having heat insulated sides comprising spaced inner and outer shells, a sheet metal cooking top, having peripheral downwardly extending flanges, supported on the upper edges of said inner shell and closely fitting the same, a frame surrounding said cooking top and anchoring the same in position, said frame closing the space between said inner and outer shells, and heating elements mounted on the lower side of said sheet metal cooking top within said flanges, whereby said heating elements serve both to heat said cooking top and to simultaneously radiate heat directly into the interior of the oven.

2. An electric oven having heat insulated sides comprising spaced inner and outer shells, a sheet metal cooking top in the form of an inverted pan, a laterally extending flange secured to the sides of said pan and resting upon and closely fitting the upper edges of said inner shell, to support the said pan thereon, a frame surrounding said cooking top and engaging said flange, so as to hold the said pan in position, said frame closing the space between said inner and outer shells, and heating elements mounted on the lower side of said sheet metal cooking top, whereby said heating elements serve both to heat said cooking top and to simultaneously radiate heat directly into the interior of the oven.

GEORGE STEINGRUBER.